(12) United States Patent
Ishida et al.

(10) Patent No.: US 6,683,396 B2
(45) Date of Patent: Jan. 27, 2004

(54) PORTABLE MOTOR POWERED DEVICE

(75) Inventors: Yosuke Ishida, Yasu-gun (JP); Tomio Yamada, Higashiazai-gun (JP); Toru Murakita, Omihachiman (JP); Kazuto Toyama, Hikone (JP); Koichi Hashimoto, Hikone (JP); Hiroshi Miyazaki, Hikone (JP); Atsumasa Kubota, Hikone (JP); Masao Yamamoto, Yasu-gun (JP)

(73) Assignee: Matsushita Electric Works, Ltd., Osaka (JP)

(*) Notice: Subject to any disclaimer, the term of this patent is extended or adjusted under 35 U.S.C. 154(b) by 30 days.

(21) Appl. No.: 10/366,466

(22) Filed: Feb. 14, 2003

(65) Prior Publication Data

US 2003/0127932 A1 Jul. 10, 2003

Related U.S. Application Data

(63) Continuation of application No. 09/745,000, filed as application No. PCT/JP00/04329 on Jun. 30, 2000.

(30) Foreign Application Priority Data

Jul. 2, 1999 (JP) .......................................... 11-189527
Dec. 22, 1999 (JP) .......................................... 11-365570

(51) Int. Cl.[7] .......................... H02K 7/14; H02K 13/04
(52) U.S. Cl. ........................ 310/50; 310/184; 310/198; 310/71; 310/130; 310/138
(58) Field of Search .......................... 310/47, 50, 179, 310/180, 184, 188, 195, 198, 127–130, 136–142, 148–151, 71

(56) References Cited

U.S. PATENT DOCUMENTS

| 1,059,351 | A | * | 4/1913 | Conklin | 310/265 |
|---|---|---|---|---|---|
| 2,595,349 | A | * | 5/1952 | Fox | 310/89 |
| 3,909,645 | A | * | 9/1975 | Herr et al. | 310/138 |
| 4,217,538 | A | * | 8/1980 | Ziemacki | 322/29 |
| 4,835,410 | A | * | 5/1989 | Bhagwat et al. | 307/64 |
| 4,988,930 | A | | 1/1991 | Oberheide | 318/82 |
| 5,213,913 | A | * | 5/1993 | Anthony et al. | 429/97 |
| 5,390,433 | A | * | 2/1995 | Brady | 38/79 |
| 6,172,437 | B1 | * | 1/2001 | Du | 310/136 |

FOREIGN PATENT DOCUMENTS

| JP | 63-7277 | 1/1988 |
|---|---|---|
| JP | 2-140775 | 11/1990 |
| JP | 3273900 | 12/1991 |
| JP | 5112062 | 5/1993 |
| JP | 7099787 | 4/1995 |
| WO | WO 89/07997 | 9/1989 |

* cited by examiner

*Primary Examiner*—Dang Le
(74) *Attorney, Agent, or Firm*—Rader, Fishman & Grauer PLLC

(57) ABSTRACT

A portable motor powered device capable of operating on a cordless battery pack as well as a corded power pack, yet enabling to reduce the size and weight of the corded power pack to be truly compatible with the corded battery pack in size and weight. The device has a housing accommodating therein a DC motor as a power source. The cordless battery pack is detachably connected to the housing and has a battery which supplies a low DC voltage for operating the DC motor. The corded power pack is detachably connected to the housing and supplies a high DC voltage for operating the DC motor. The corded power pack includes a power cord adapted to be connected to receive an AC source voltage and a converter for converting the AC source voltage into the high DC voltage. The DC motor has a rotor provided with first and second windings which are selectively connected to receive low and high DC voltages respectively from the cordless battery pack and the corded power pack. Thus, the corded power pack can be designed to supply the high DC voltage directly converted from the AC voltage source and therefore dispense with a step-down transformer of bulky and heavy nature.

15 Claims, 11 Drawing Sheets

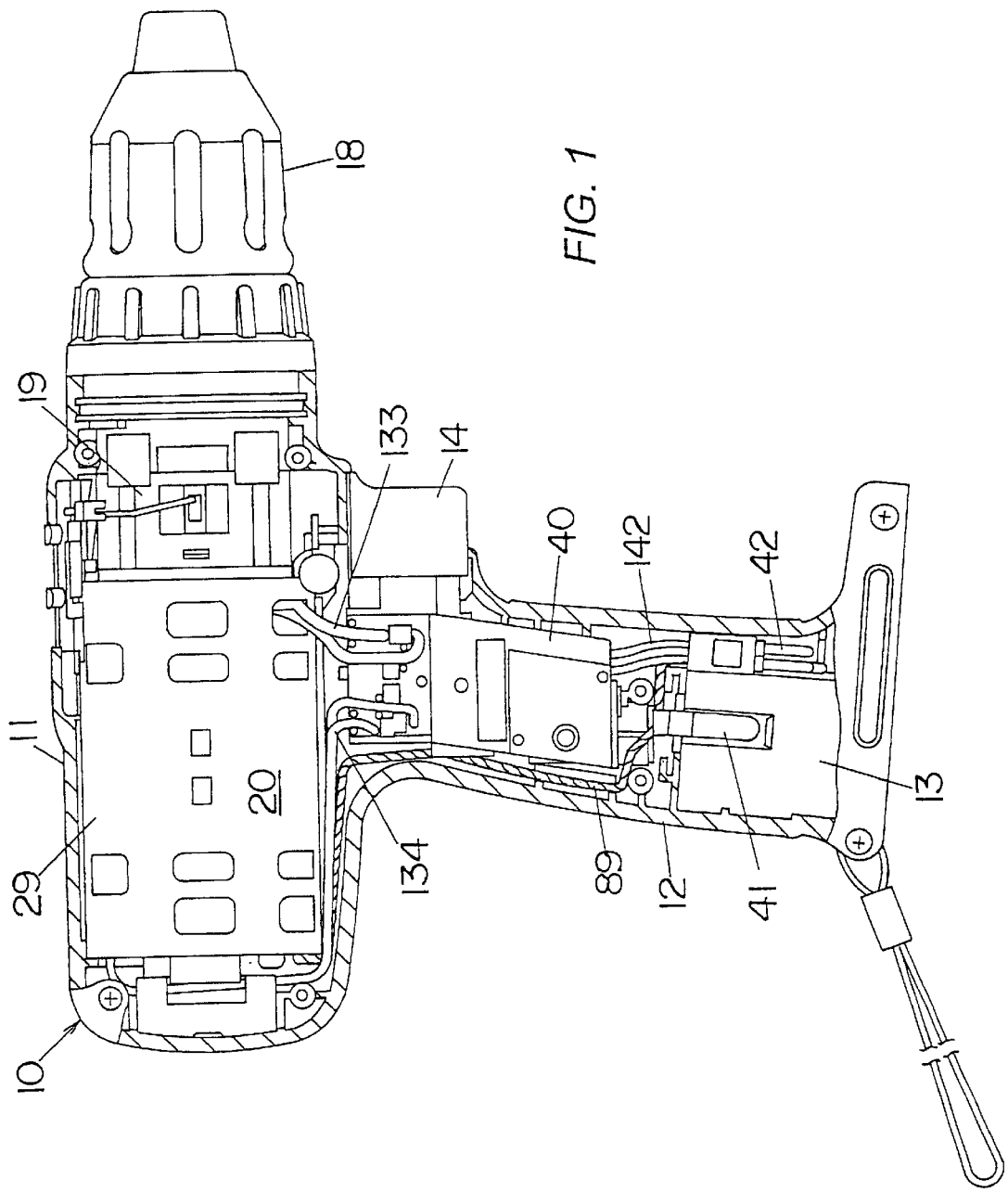

PORTABLE MOTOR POWERED DEVICE

This application is a continuation of application Ser. No. 09/745,000, filed Feb. 22, 2001, which was the National Stage of International Application No. PCT/JP00/04329, filed Jun. 30, 2000.

TECHNICAL FIELD

The present invention relates to a portable motor powered device such as a power tool, and more particularly to such a motor powered device which is capable of operating on either one anyone of a low DC voltage supplied from a codeless battery pack and a high DC voltage supplied from a corded power pack.

BACKGROUND ART

WO 89/07997 discloses a dual-mode system for motor powered device which utilizes a cordless battery pack and a corded power pack selectively for energizing a motor. The corded battery pack contains cells to provide a DC voltage to the motor. The corded power pack includes a power code for receiving an AC source voltage and a converter for converting the AC voltage to the DC voltage to be supplied to the motor. In order to make the corded power pack compatible with the cordless battery pack, the corded power pack further includes a step-down transformer. However, such transformer is generally bulky and heavy, and therefore adds extra dimension and weight to the corded power pack as compared to the cordless battery pack. This is not satisfactory when the powered device is required to be compact and lightweight enough to be completely portable.

DISCLOSURE OF THE INVENTION

In view of the above insufficiency, the present invention has been accomplished to provide a portable motor powered device which is capable of operating on a cordless battery pack as well as a corded power pack, yet enabling to reduce the size and weight of the corded power pack to be truly compatible with the corded battery pack in size and weight. The device in accordance with the present invention comprises a housing accommodating a DC motor. The cordless battery pack is detachably connected to the housing and has a battery which supplies a low DC voltage for operating the DC motor. The corded power pack is detachably connected to the housing and supplies a high DC voltage for operating the DC motor. The corded power pack includes a power cord adapted to be connected to receive an AC source voltage and a converter for converting the AC source voltage into the high DC voltage. The characterizing feature of the present invention resides in that the DC motor includes a rotor which is provided with a first winding and a second winding, the first winding being coupled to receive the low DC voltage for driving the DC motor, and the second winding being coupled to receive the high DC voltage for driving the motor. Thus, the DC motor can be driven by either one of the low DC voltage supplied from the cordless battery pack and the high DC voltage supplied from the corded power pack. Accordingly, the corded power pack can be designed to supply the high DC voltage directly converted from the AC voltage source and therefore dispense with a step-down transformer of bulky and heavy nature. Thus, the corded power pack can be made compact and light-weight as or even less than the cordless battery pack, so that the motor powered device attached with the corded power pack can be made compact and lightweight sufficiently to be truly portable.

Preferably, the first and second windings are designed to give the same torque-speed characteristic when operated at the low DC voltage and at the high DC voltage, respectively for assuring consistent work by the device.

The housing includes a first electrical path connecting the low DC voltage to the first winding and a second electrical path connecting the high DC voltage to the second winding. The first and second electrical paths are preferred to be separated from each other so that they can be designed independently from each other and therefore in accordance with specific requirements as to insulation distance and current carrying capacity. That is, the second electrical path, which carries a small current from the high DC voltage, can be designed to be have reduced conductor's size as compared to the first electrical path carrying a large current from the low DC voltage. And, the first electrical path, which carries a large current from the low DC voltage, can be designed to have a short insulation distance as compared to the second electrical path carrying a small current from the high DC voltage.

It is preferred that the first winding is designed to operate on the low DC voltage of 2.4 to 48 volts, while the second winding is designed to operate on the high DC voltage of 100 to 300 volts.

Also, the cordless battery pack and the corded power pack may have respective casings of similar shape which are selectively attached to the housing.

The casing of the cordless battery pack includes a first plug for insertion into a socket of the housing, and the casing of the corded power pack includes a second plug for insertion into the same socket. The first plug has a low voltage contact for electrical connection with a first terminal provided in the socket, while the second plug having a high voltage connector for electrical connection with a second terminal provided in the socket.

The corded power pack may include a ground lead extending therefrom for connection to the ground. The second connector has a ground terminal for electrical connection between the motor and the ground line. Thus, the motor power device can be grounded when using the high DC voltage from the corded power pack.

Further, the corded power pack includes a circuit board on which the converter is mounted. The circuit board may include a grounding line for connection between the ground terminal and the ground lead. The ground line is connected to a noise reduction capacitor on the printed circuit board.

Preferably, one end of the power cord is supported to the casing of the corded power pack to pivot about a pivot axis so that a user is easy to operate the device without being hindered by the power cord. In this connection, the corded power pack may further include a click mechanism for retaining the one end of the power cord at least one angular position around the pivot axis. Thus, the device can be stored easily in place with the power cord being latched.

The device may include a speed sensor which is connectable to non-energized one of the first and second windings to detect an alternating voltage developed across the non-energized winding one of said first and second windings for sensing a rotation speed of the motor while the other one of the first and second windings is energized to drive the motor. Thus, the non-energized one of the first and second windings can be best utilized for controlling the rotation speed of the motor.

The housing includes a power switch for connecting the low and high DC voltages to the first and second windings, respectively. The rotor includes a core provided with the first and second windings, and a rotor shaft extending through the core. The rotor shaft carries first and second commutators respectively connected to the first and second windings. The first and second commutators are preferably disposed on opposite sides of the core to be spaced axially along the rotor shaft for contact with first and second brushes which supply currents respectively from the low and high DC voltages. The first brush is connected to the power switch through a low voltage line, while the second brush is connected to the power switch through a high voltage line. The low voltage line is preferably routed within the housing a shorter distance than the high voltage line. Thus, the low voltage lime carrying a relatively large current can reduce ohmic loss.

Further, the rotor shaft is preferred to carry a cooling fan which is disposed adjacent to the first brush for effectively cooling the first brush carrying the large current and having contact resistance with the first commutator.

These and still other objects and advantageous features of the present invention will become apparent from the following description of the preferred embodiment when taken in conjunction with the attached drawings.

BRIEF DESCRIPTION OF THE DRAWINGS

FIG. 1 is a front view partly in section of a portable motor powered device in the form of a power tool, shown with a cordless battery pack and a coded power pack detached therefrom, in accordance with a preferred embodiment of the present invention;

BEST MODE FOR CARRYING OUT THE INVENTION

Figure 3:
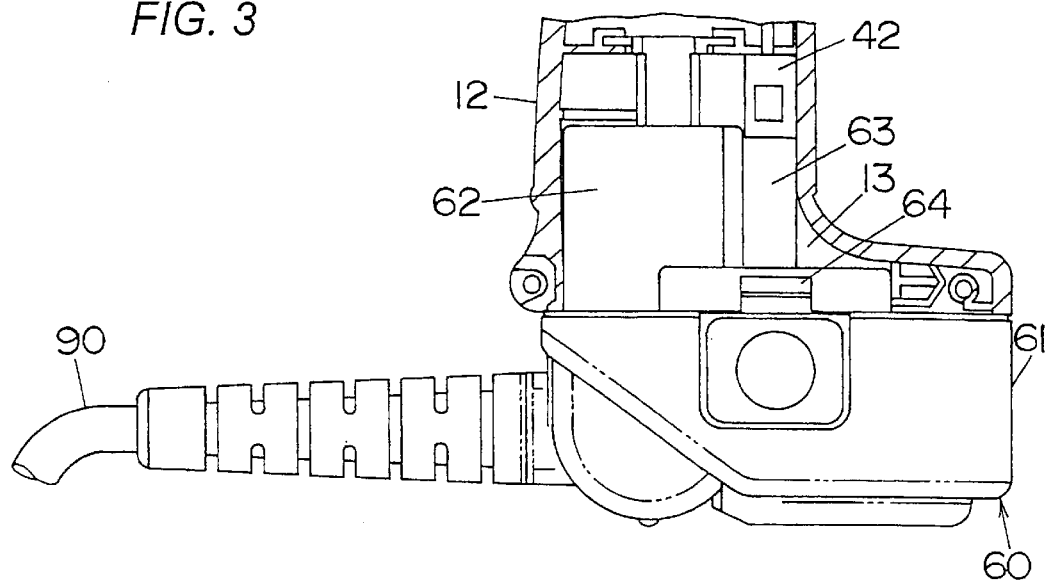
FIG. 3 is a front view of the corded power pack as attached to the power tool.
Figure 2:
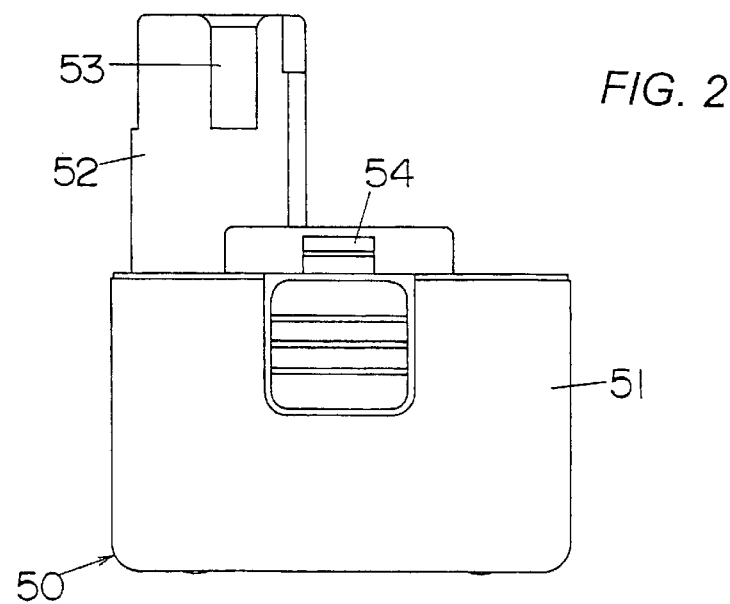
FIG. 2 is a front view of the cordless battery pack.

Referring now to FIGS. 1 to 2, there is shown a portable motor powered device in the form of a power tool in accordance with a preferred embodiment of the present invention. The power tool is designed to be energized selectively by a cordless battery pack 50 and a corded power pack 60. The power tool includes a housing 10 accommodating therein a DC magnet motor 20 and a power switch 40 for electrical connection and disconnection of the motor 20 to and from the cordless battery pack 50 and the corded power pack 60. The housing is T-shaped to have a cylinder 11 and a handle grip 12 extending from the lengthwise center of the cylinder 11. The motor 20 is disposed in a rear half of the cylinder 11 and has a rotor shaft 23 connected through a reduction gear set 19 to a chuck 18 at the front end of the cylinder for rotating a tool bit such as a drill bit and a screw driver bit held by the chuck 18. The power switch 40 is disposed within the upper portion of the handle grip 12 adjacent to the cylinder 11 and is actuated by a switch handle 14 at the upper end of the handle grip 12. The lower end of the handle grip 12 is shaped to have a socket 13 for detachably receiving portions of the cordless battery pack 50 and the corded power pack 60. For this purpose, the battery pack 50 and the power pack 60 are respectively provided with hooks 54 and 64 for mechanical engagement with associated recesses formed around a bottom opening of the socket 13, as shown in FIGS. 2 and 3. The power switch 40 is connected to a first terminal 41 which extends into the socket 13 for electrical connection with the battery pack 50, and is also connected through leads 142 to a second terminal 42 which is located in the socket for electrical connection with the power pack 60.

Figure 4:
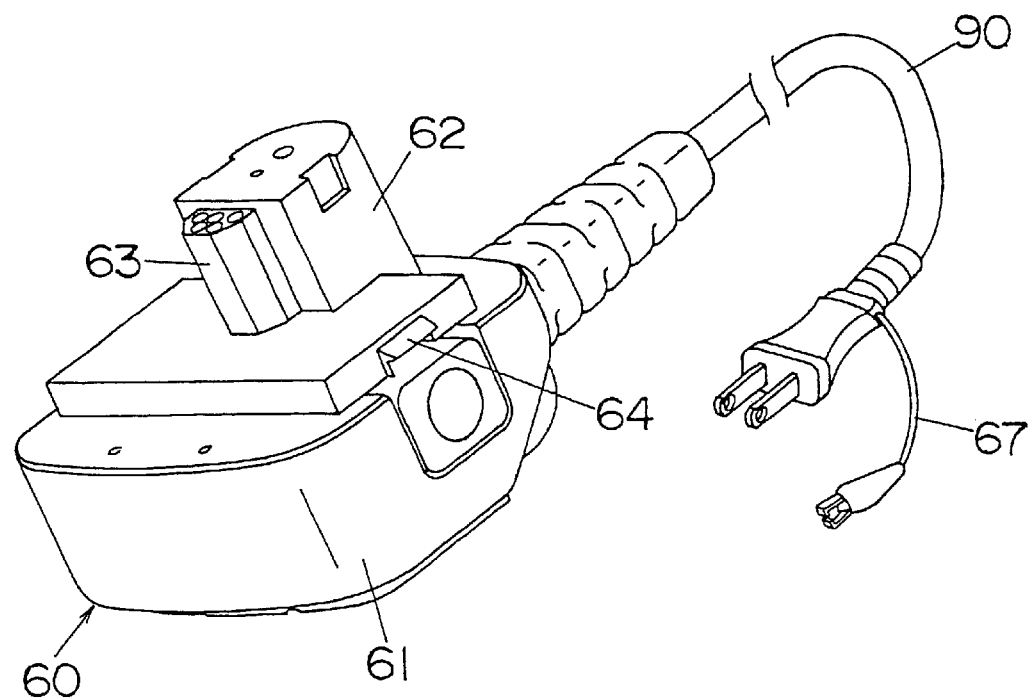
FIG. 4 is a perspective view of the corded power pack.
Figure 7:
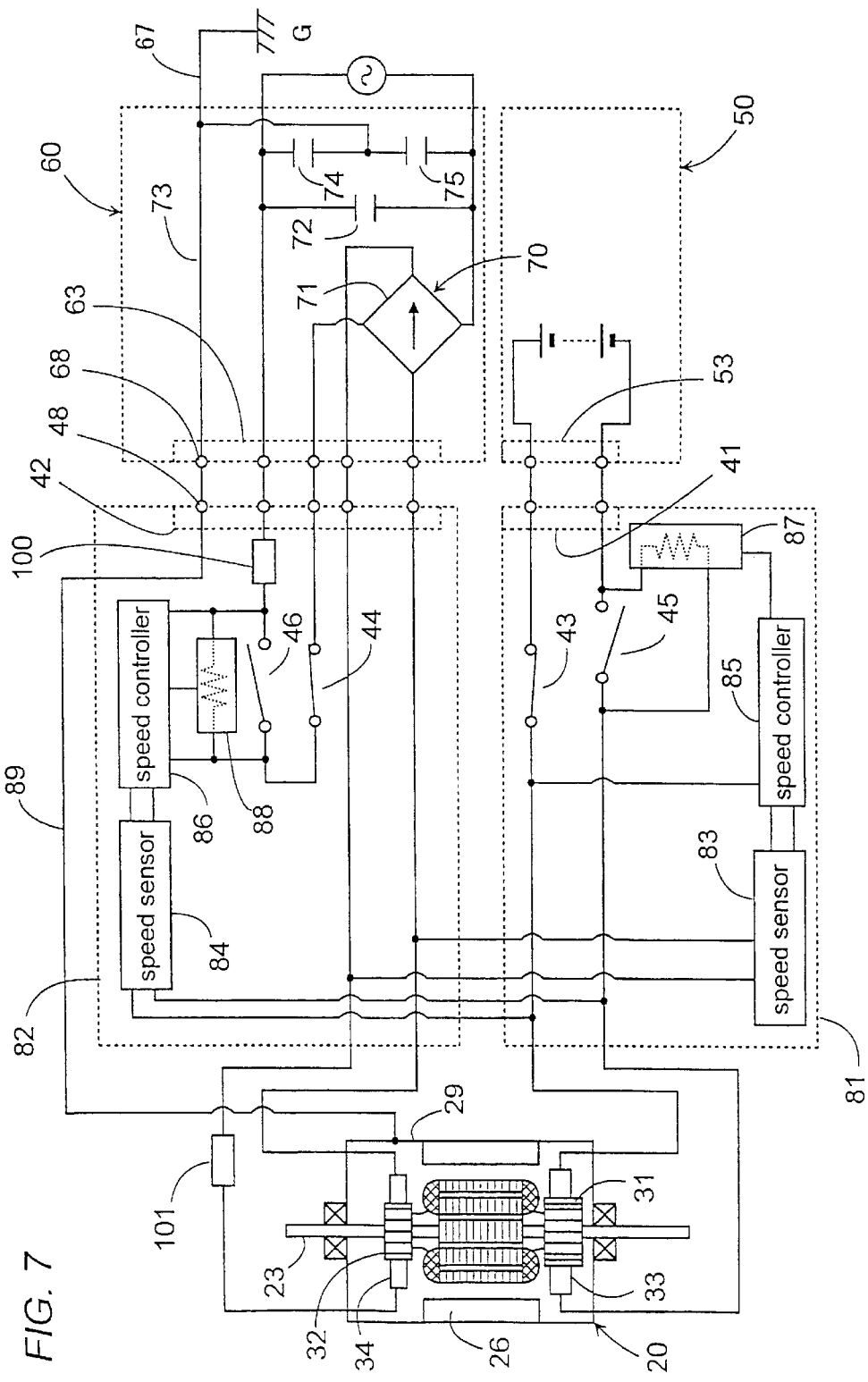
FIG. 7 is a circuit diagram of the power tool.

As shown in FIG. 2, the cordless battery pack 50 has a casing 51 containing therein rechargeable cells providing a low DC voltage in the range of 2.4 to 40 volts. The casing has a plug 52 which fits into the socket and carries a pair of contacts 53 for electrical connection with the first terminal 41 of the power switch 40. As shown in FIGS. 3 and 4, the corded power pack 60 has a casing 61 from which a power cord 90 extends for connection with an ac mains, i.e., AC source voltage. The casing 61 incorporates a converter 70 which converts the source AC voltage into a smoothed AC voltage in the range of 100 to 300 volts. The casing 61 also includes a plug 62 which fits into the socket 13 and is provided with a shielded connector 63 for electrical connection with the second terminal 42 of the power switch 40. As shown in FIG. 7, the power switch 40 includes a pair of main contacts 43 and 44 which are simultaneously actuated by the switch handle 14 to connect and disconnect the motor 20 to and from the low DC voltage supplied from the cordless battery pack 50 when it is attached to the power tool, and the high DC voltage supplied from the corded power pack 60 when it is attached to the power tool.

Figure 5:
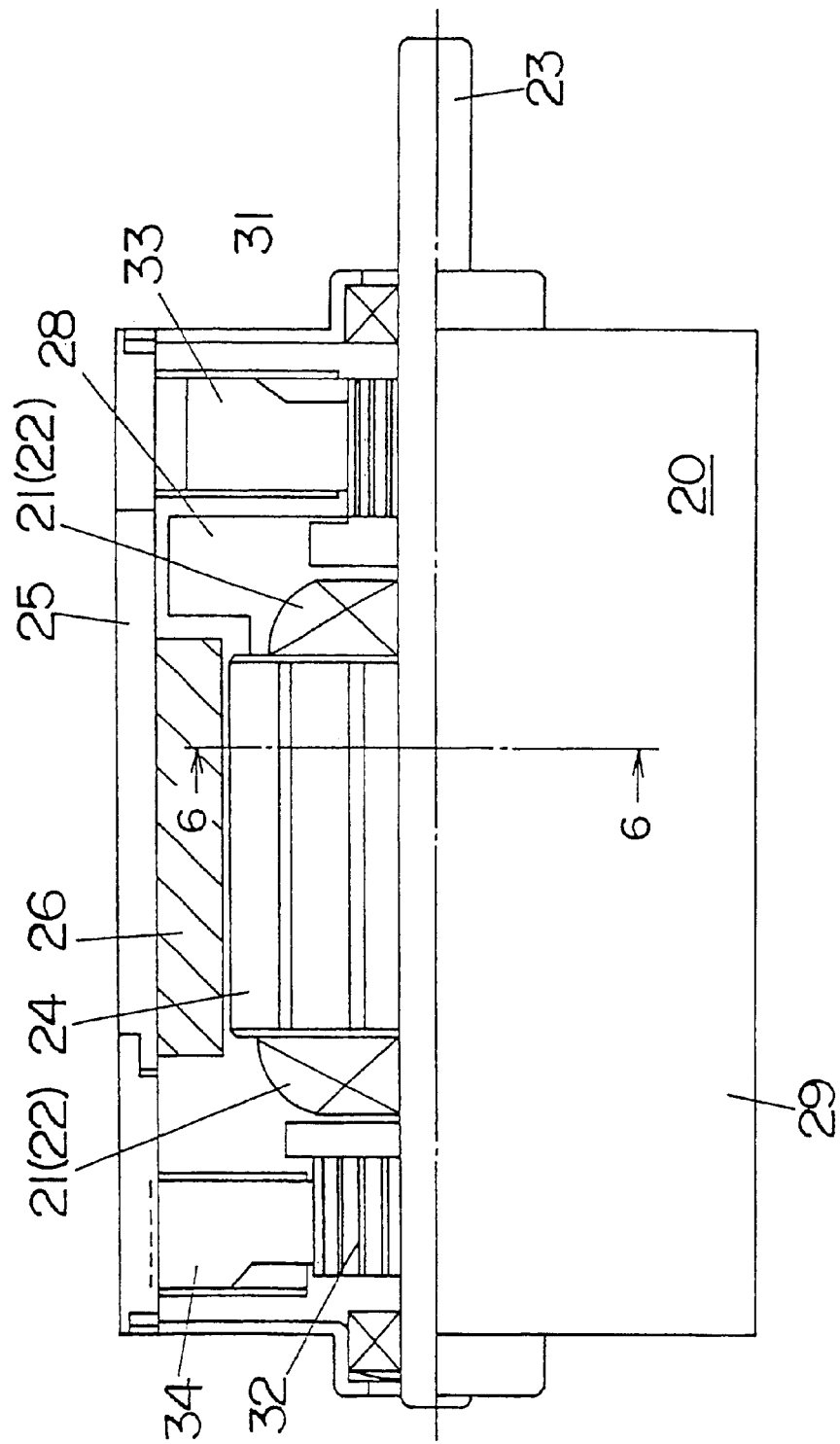
FIG. 5 is a front view partly in section of a DC motor utilized in the above power tool.
Figure 6:
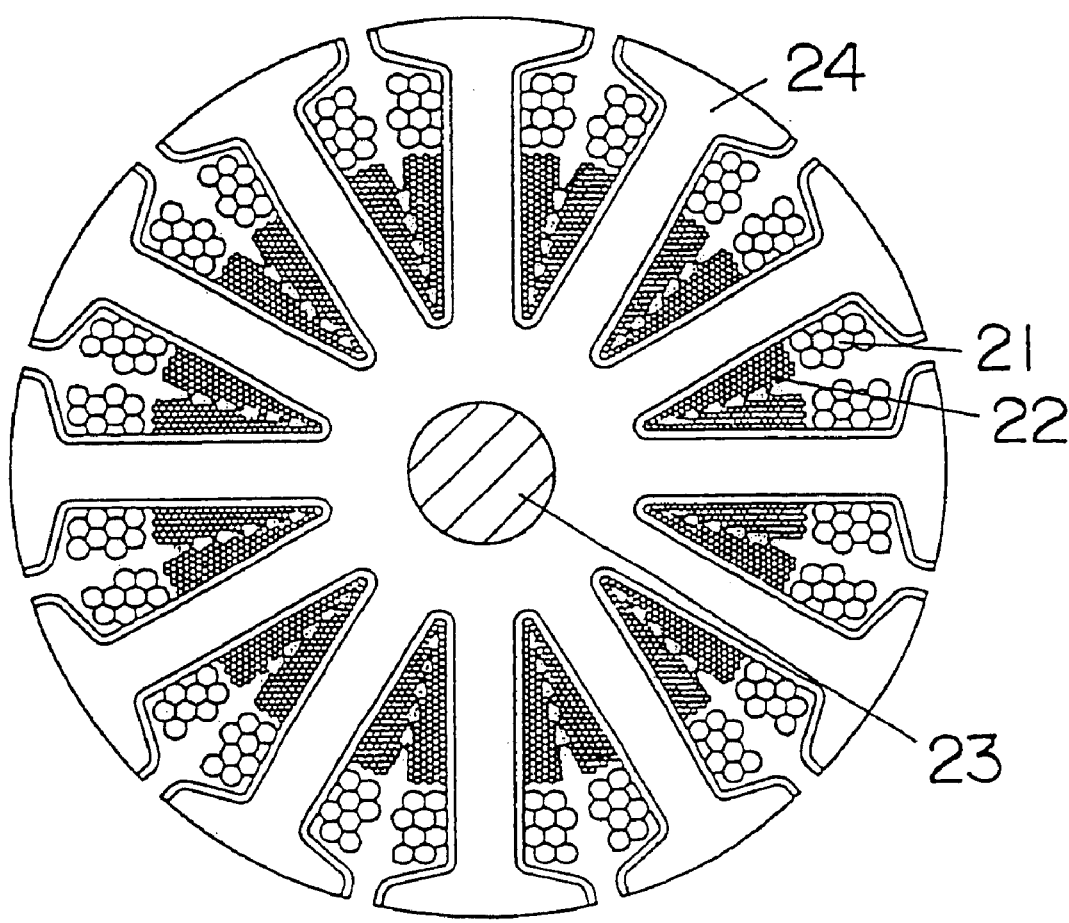
FIG. 6 is a sectional view taken along line 6—6 of FIG. 5.
Figure 8:
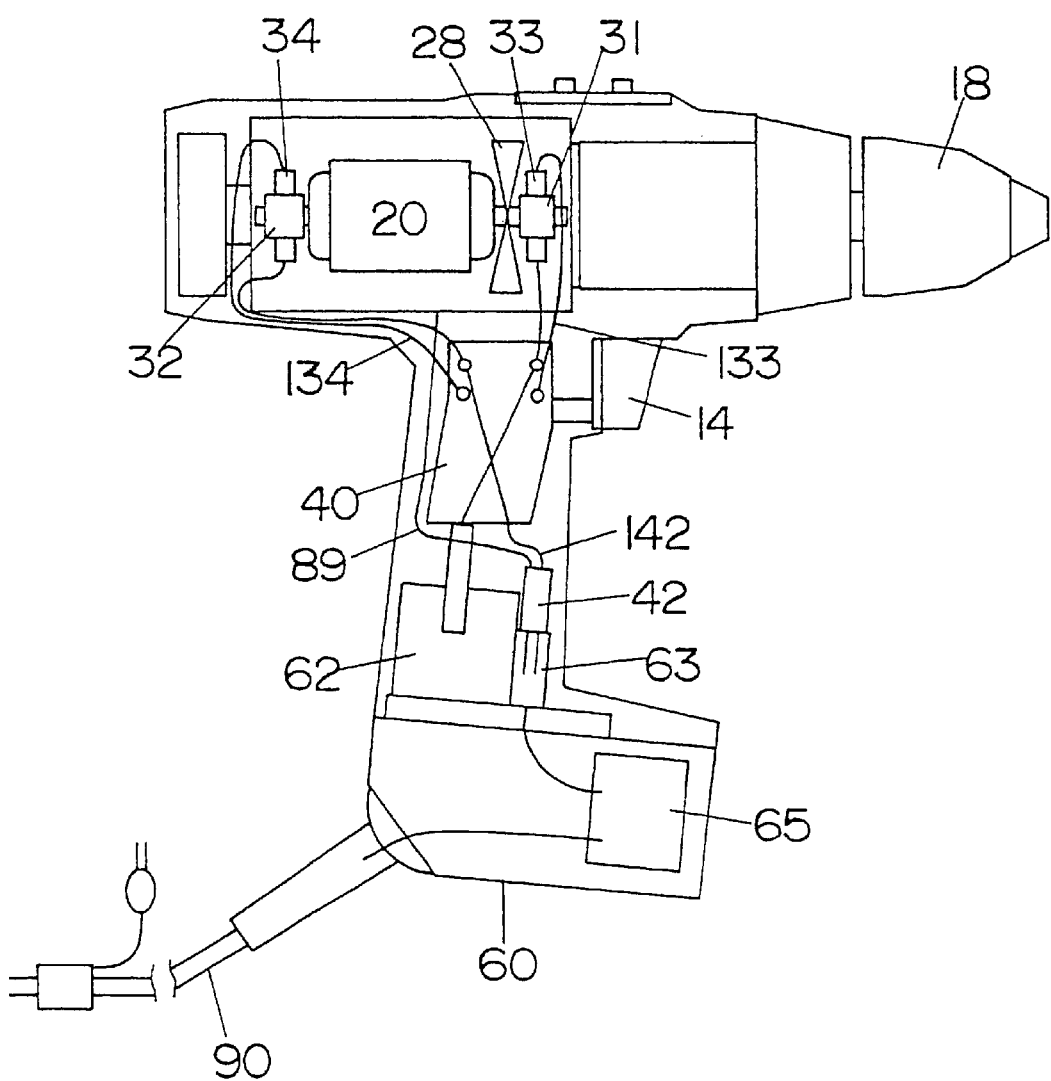
FIG. 8 is a schematic view illustrating an internal wiring of the power tool.

The DC motor 20 is designed to operate either one of the low DC voltage and the high DC voltage. As shown in FIGS. 5 and 6, the motor 20 comprises a stator 25 mounting a plurality of permanent magnets 26, and a rotor with the rotor shaft 23 and a plurality of cores 24 extending radially from the rotor shaft 23. The rotor carries a first winding 21 and a second winding 22 which are independently wound around the cores 24 and are connected to receive currents respectively from the low DC voltage and the high DC voltage so that the motor 20 is driven to rotate by either one of the low and high DC voltages. As shown in FIG. 6, the first winding 21 which receives the current from the battery pack 50 of limited energy source is designed to have a large cross section in order to minimize a current loss, while the second winding 22 which receives the current through the power pack 60 from the AC mains of virtually unlimited energy source is designed to have a small cross section in order to increase the number of turns for equalizing the torque-speed characteristic of the motor when the first winding 21 is energized and the second winding 22 is energized. The rotor shaft 23 is provided with a first commentator 31 and a second commutator 32 which are on opposite sides of the cores 24 to be axially spaced along the length of the rotor shaft 23. In correspondence to the first and second commutators 31 and 32, the motor 20 has first and second brushes 33 and 34 for supplying the currents to the first and second windings respectively from the low DC voltage and the high DC voltage. As shown in FIG. 8, the first brush 33 is located adjacent the front end of the motor 20 and is connected to the power switch 40 through leads 133, while the second brush 34 is located adjacent the rear end of the motor and is connected to the power switch 40 through leads 134. The lead 133, which defines a low voltage line flowing a relatively large current from the battery pack 50, is routed a shorter distance than the lead 134 defining a high voltage path for flowing a small current from the power pack 60. Thus, the lead 133 flowing the large current can give only a minimum loss or minimum resistive heating. Further, the rotor shaft 23 carries a cooling fan 28 immediately adjacent to the first brush 33 to effectively cool the first brush 33 as well as the first commentator 31 carrying the large current.

Now referring back to FIG. 7, a detailed explanation is made as to a circuit arrangement provided for electrical connection of the motor 20 with the battery pack 50 as well as the power pack 60. The circuit is composed of a low voltage circuit 81 for energizing the first winding 21 by the battery pack 50 and a high voltage circuit 82 for energizing the second winding 22 by the power pack 60. The low voltage circuit 81 includes, in addition to the main contact 43, a sub contact 45, a speed sensor 83, a speed controller 85, and a semiconductor element 87 capable of flowing a portion of the current from the battery pack 50. Likewise, the high voltage circuit 82 includes, in addition to the main contact 44, a sub contact 46, a speed sensor 84, a speed controller 86, and a semiconductor element 88 capable of flowing a portion of the current from the power pack 60. The sub contacts 45 and 46 are normally kept open and are actuated to close only when the switch handle 14 is pressed deeply to a further extent. The semiconductor devices 87 and 88 are connected across the sub contacts 45 and 46 to flow therethrough portions of the currents respectively from the battery pack 50 and the power pack 60 until the sub contacts 45 and 46 are closed, so as to regulate the amount of the currents being respectively fed to first and second windings 21 and 22 in accordance with commands from the speed controllers 85 and 86. Each of the speed controllers 85, 86 is connected to the corresponding one of the speed sensors 83 and 84 to receive therefrom a signal indicative of a current motor speed and in turn provides the command which regulates the current for control of the motor speed in a known feedback manner. Each speed sensor 83 and 84 are connected across each one of the second and first windings 22 and 21 to develop an alternating voltage in proportion to the current motor speed. The speed detection is made by use of the non-energized one of the first and second windings 21 and 22. That is, when the first winding 21 is energized to drive the motor 20, the non-energized second winding 22 serves to detect the motor speed, and vice versa. When the switch handle 14 is pressed deeply, the sub contacts 45 and 46 are closed to shunt the semiconductor elements 87 and 88, respectively, thereby disabling the speed control and allowing the motor to operate at its full power.

Figure 9:
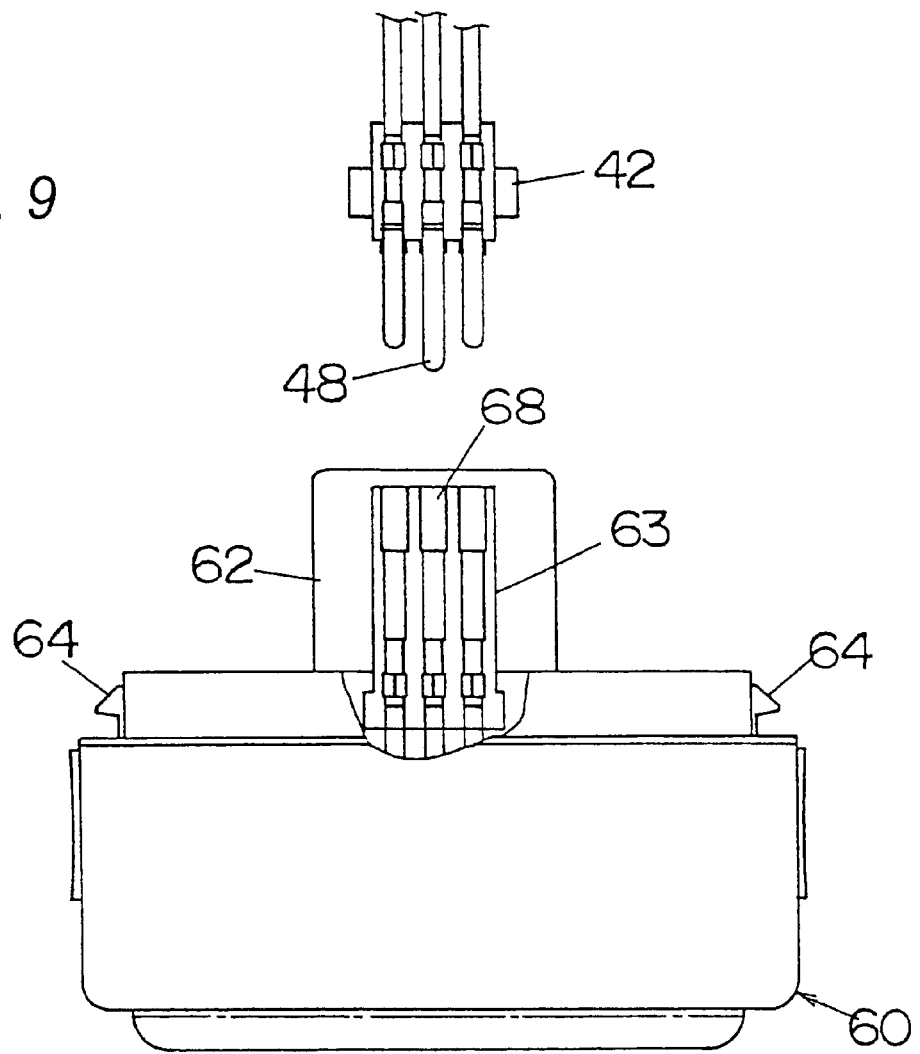
FIG. 9 is an exploded view illustrating an electrical connection of the corded power pack to a corresponding terminal provided in a power tool housing.

As is shown in FIG. 7, the main switch 44 and the sub switch 46 of the high voltage circuit 82 are inserted in an AC voltage line leading to the input of a rectifier 71 forming the converter 70 so that these switches have less chances of suffering arc welding than being inserted in a DC voltage line. In this consequence, the second terminal 42 of the power pack 60 is configured to be of a five-pin arrangement including a pin for a ground line 89 leading to a motor casing 29. The corded power pack 60 also includes a ground line 73 extending from a ground terminal 68 of the shielded connector 63 to a ground lead 67 which extends outwardly of the power pack 60 along the power cord 90 for connection of the motor casing 29 to the ground. The ground line 73 is formed on a circuit board 65 mounting thereon the converter 70 composed of the rectifier 71 and a smoothing capacitor 72. The ground line 73 is connected on the circuit board 65 to noise reduction capacitors 74 and 75. As shown in FIG. 9, the second terminal 42 has a ground pin 48 for connection with the ground terminal G of the shielded connector 63. The ground pin 48 is made longer than the other pins so as to engage first and disengage last to and from the ground terminal 68 of the shielded connector 63.

Figure 10:
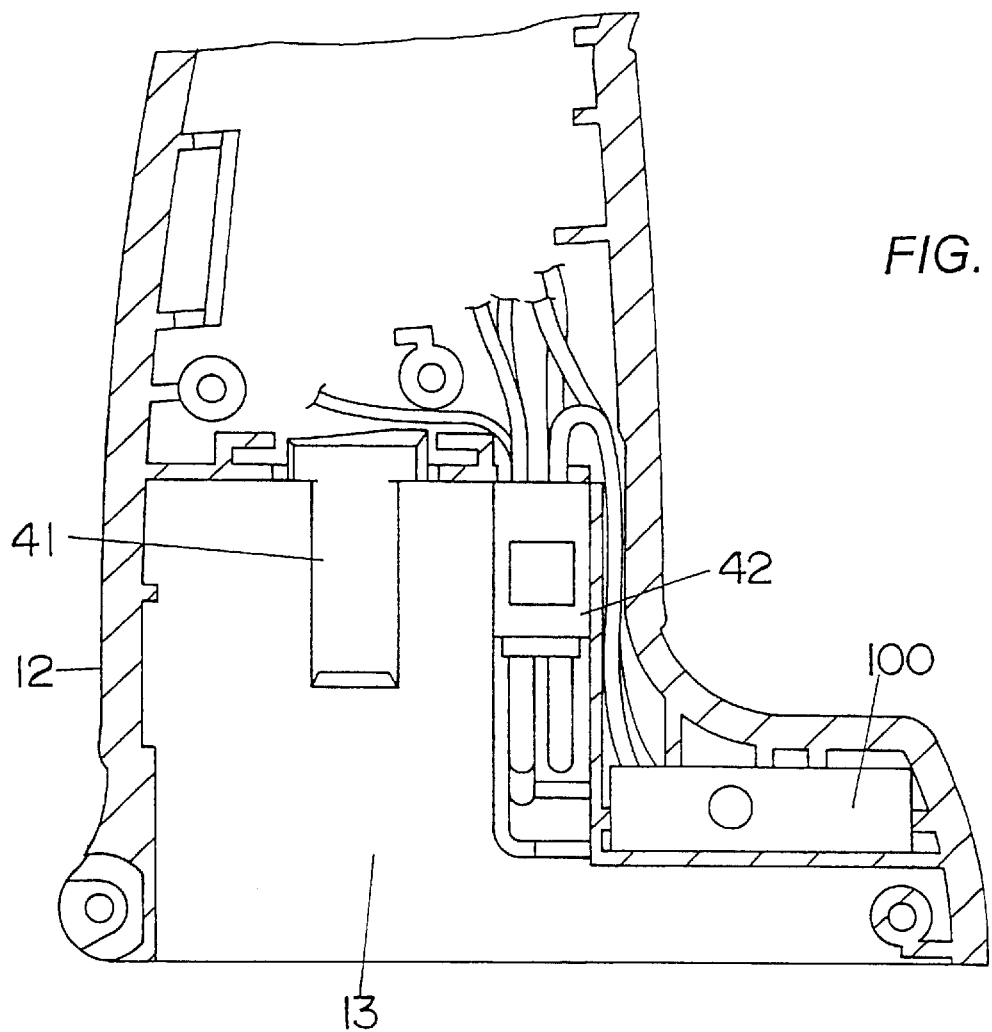
FIG. 10 is a partial sectional view illustrating a modified housing of the power tool.

The power tool is preferably provided with an overload protective element 100 such as a thermostat in the AC voltage line feeding the source AC voltage to the power pack 60 to provide overload protection of the power tool when the motor sees an overload current from the AC source voltage through the corded power pack. The overload protective element may be located in the high voltage circuit 82, as shown in FIG. 7, or in the power pack 60. When installed in the high voltage circuit, the element is preferred at the lower end of the hand grip 12, as shown in FIG. 10, a site remote from the motor 20 to be less thermally affected thereby. Another overload protective element 101 such as a thermal fuse may be additionally provided in a line of feeding the current to the motor 20 from the power pack and adjacent to the motor 20 for protection of a user as well as the power tool against possible overheating of the motor.

Figure 11:
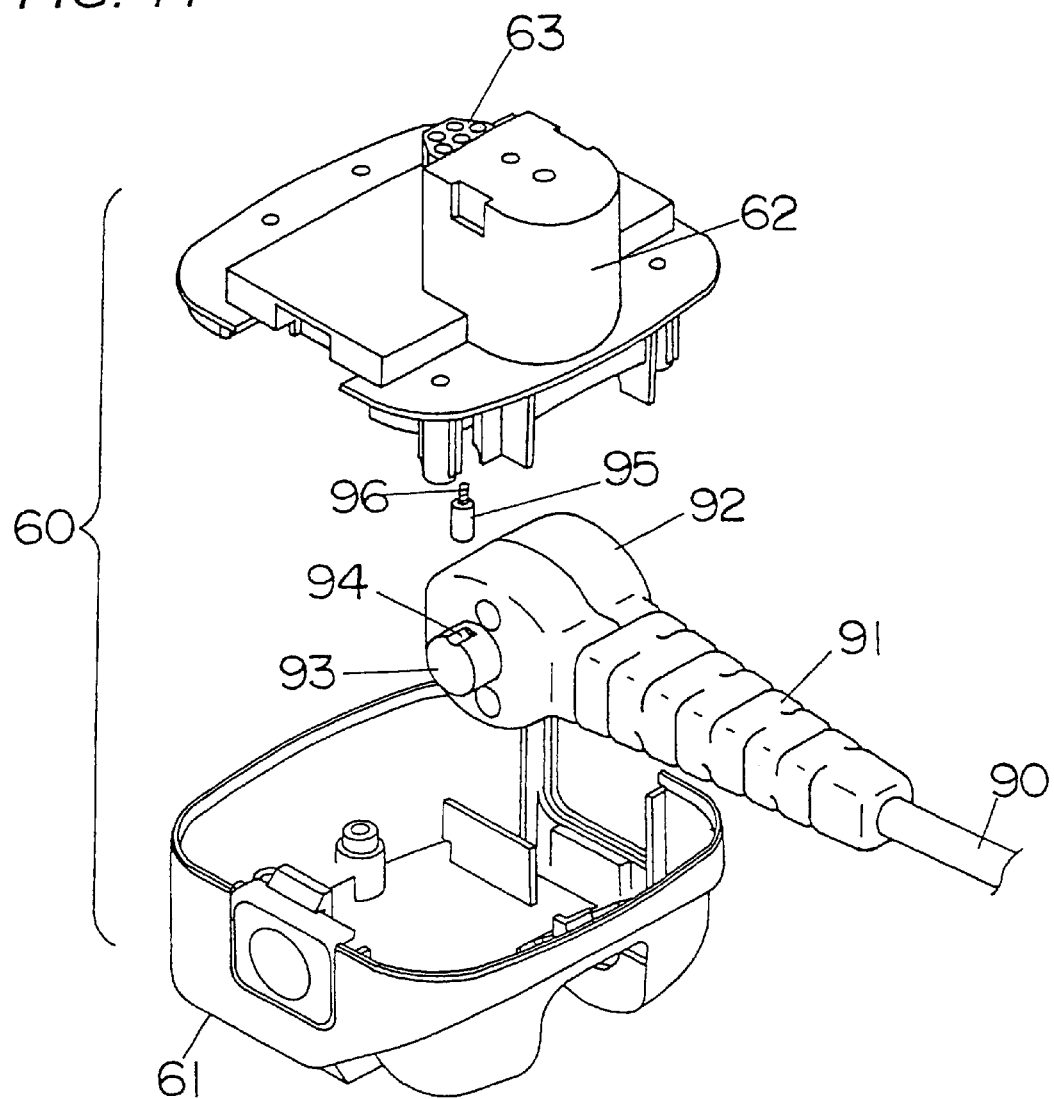
FIG. 11 is an exploded perspective view of the corded power pack.
Figure 12A:
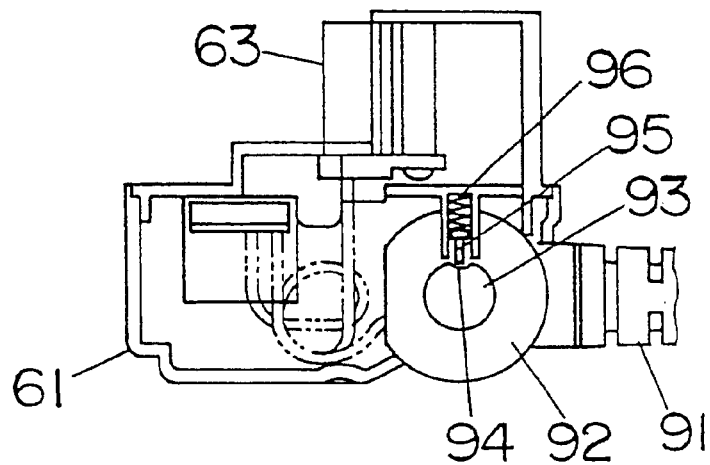
FIGS. 12A and 12B are partial views respectively illustrating operations of a click mechanism included in the coded power pack for pivotal support of one end of a power cord.
Figure 12B:
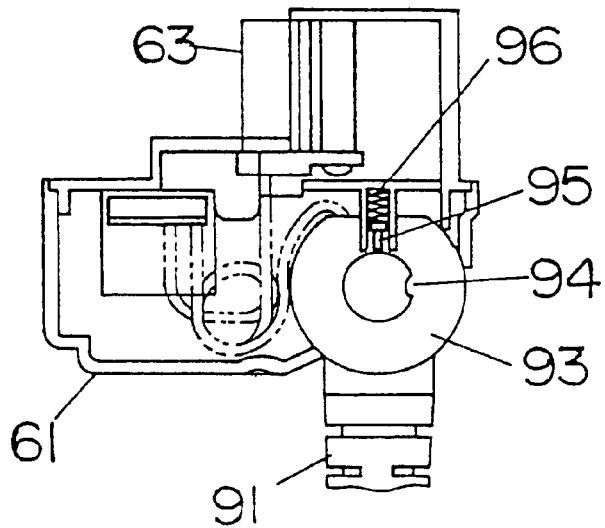

As shown in FIGS. 11 and 12, the power cord 90 is supported to the casing 61 of the corded power pack 60 to be freely pivotable so that the power cord 90 can depend vertically irrespective of an orientation angle of the power tool for facilitating the handling of the power tool. For this purpose, the power cord 90 is formed at its end adjacent to a strain relief 91 with a rounded joint 92 having a pair of pivot pins 93. The pivot pins 93, which are engaged loosely into corresponding bearing holes in the lower end of the casing 61, are provided respectively with dents 94 for clicking engagement with corresponding latches 95 supported to the casing 61. The latches 95 constitutes a click mechanism of holding the joint 92 at one angular position about a pivot axis defined by the pivot pins 93. At the angular position, the power cord 90 extends horizontally, as shown in FIG. 12A, i.e., in a direction generally parallel to the cylinder 11 of the power tool. Thus, the power cord 90 can be held in a position suitable for storing the power tool in a place. In use, the power cord 90 is forced to pivot from the clicked poison by which the latches 95 are disengaged out of the dents 94 against a bias spring 96, as shown in FIG. 12B, leaving the power cord to pivot freely about the pivot axis.

What is claimed is:

1. A portable motor powered device comprising:
   a housing accommodating a DC motor which operates selectively at two different DC voltages;
   a cordless battery pack detachably connected to said housing and having a battery which supplies a low DC voltage for operating said DC motor;
   a corded power pack detachably connected to said housing and supplying a high DC voltage for operating said motor, said corded power pack having a power cord adapted to be connected to receive an AC source voltage and a converter for converting said AC source voltage into said high DC voltage;
   wherein
   said DC motor includes a rotor provided with a first winding and a second winding, said first winding being coupled to receive said low voltage for driving said DC motor, and said second winding being coupled to receive said high voltage for driving said DC motor;

said housing includes a power switch for connecting said low and high DC voltages to said first and second windings, respectively, said rotor including a core provided with said first and second windings and a rotor shaft extending through said core, said rotor shaft carrying first and second commutators respectively connected to said first and second windings, said first and second commutators being disposed on opposite sides of said core to be spaced axially along said rotor shaft and being in contact with first and second brushes which supply currents respectively from said low and high DC voltages, said first brush being connected to said power switch through a low voltage line, said second brush being connected to said power switch through a high voltage line, said low voltage line being routed within said housing a shorter path than said high voltage line.

2. The portable motor powered device as set forth in claim 1, wherein said housing having a common socket for selectively receiving said cordless battery pack and said corded power pack.

3. The portable motor powered device as set forth in claim 2, wherein said first and second windings are designed to give the same torque-speed characteristic to said DC motor when operated at said low DC voltage and at said high DC voltage, respectively.

4. The portable motor powered device as set forth in claim 2, wherein said housing includes a first electrical path connecting said low DC voltage to said first winding, and a second electrical path connecting said high DC voltage to said second winding, said first and second electrical paths being separated from each other.

5. The portable motor powered device as set forth in claim 2, wherein said first winding is designed to operate on said low DC voltage of 2.4 to 48 volts, while said second winding is designed to operate on said high DC voltage of 100 to 300 volts.

6. The portable motor powered device as set forth in claim 2, wherein said cordless battery pack and said corded power pack have respective casings of similar shape which are selectively attached to said housing.

7. The portable motor powered device as set forth in claim 6, wherein the casing of said cordless battery pack includes a first plug for insertion into a socket of said housing, and the casing of said corded power pack includes a second plug for insertion into said socket, said first plug having a low voltage contact for electrical connection with a first terminal provided in said socket, and said second plug having a high voltage connector for electrical connection with a second terminal provided in said socket.

8. The portable motor powered device as set forth in claim 7, wherein said corded power pack has a ground lead extending therefrom for connection to the ground, said second connector including a ground terminal for electrical connection between said motor and said ground lead.

9. The portable motor powered device as set forth in claim 8, wherein said corded power pack includes a circuit board on which, said converter is mounted, said circuit board including a ground line for connection between said ground terminal and said ground lead, said ground line being connected to a noise reduction capacitor on said printed circuit board.

10. The portable motor powered device as set forth in claim 2, further including: a speed sensor which is connectable to non-energized one of said first and second windings to detect an alternating voltage developed across said non-energized energized one of said first and second windings for sensing a rotation speed of said motor while the other one of said first ands second windings is energized to drive said motor.

11. The portable motor powered device as set forth in claim 2, said housing has a handle grip which is formed with said common socket having a bottom opening, said cordless battery pack and said corded power pack are provided respectively with hooks for mechanical engagement with portions around said bottom opening.

12. The portable motor powered device as set forth in claim 11, wherein said cordless battery pack has a first casing with a first plug for insertion into said common socket, and said corded power pack has a second casing with a second plug for insertion into said common socket, each of said first casing and said second casing being configured to close said bottom opening of said common socket.

13. The portable power device as set forth in claim 12, wherein one end of said power cord is pivotably supported to said second casing to pivot about a pivot axis.

14. The portable motor powered device as set forth in claim 13, wherein said second casing includes a click mechanism for retaining said power cord at least one angular position around said pivot axis.

15. The portable motor powered device as set forth in claim 1, wherein said rotor shaft carries a cooling fan which is disposed adjacent to said first brush.

* * * * *